(12) United States Patent
Shinozuka et al.

(10) Patent No.: US 9,912,898 B2
(45) Date of Patent: Mar. 6, 2018

(54) AMPLIFIER, ELECTRIC CIRCUIT, AND IMAGE SENSOR

(71) Applicant: KABUSHIKI KAISHA TOSHIBA, Minato-ku, Tokyo (JP)

(72) Inventors: Yasuhiro Shinozuka, Fuchu Tokyo (JP); Masanori Furuta, Odawara Kanagawa (JP); Kei Shiraishi, Kawasaki Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 15/256,513

(22) Filed: Sep. 3, 2016

(65) Prior Publication Data

US 2017/0070695 A1    Mar. 9, 2017

(30) Foreign Application Priority Data

Sep. 9, 2015    (JP) .................................. 2015-177480

(51) Int. Cl.
*H04N 5/378* (2011.01)
*H04N 5/374* (2011.01)
(Continued)

(52) U.S. Cl.
CPC .................................. *H04N 5/378* (2013.01)

(58) Field of Classification Search
CPC .......... H04N 5/378; H04N 5/374; H03F 3/08; H03F 3/082; H03M 1/56
(Continued)

(56) References Cited

U.S. PATENT DOCUMENTS 7,733,402 B2 *    6/2010    Egawa ................... H04N 3/155
                                                                   348/208.1
2001/0000661 A1 *    5/2001    Miyamoto ............ G06F 7/5013
                                                                        341/56
(Continued)

FOREIGN PATENT DOCUMENTS

JP    2015226103 A    12/2015
WO    2015182361 A1    12/2015
WO    2015182715 A1    12/2015

OTHER PUBLICATIONS

John K. Fiorenza, et al., "Comparator-Based Switched-Capacitor Circuits for Scaled CMOS Technologies", IEEE Journal of Solid-State Circuits, vol. 41, No. 12, Dec. 2006, pp. 2658-2668.

*Primary Examiner* — Tuan Ho
*Assistant Examiner* — Marly Camargo
(74) *Attorney, Agent, or Firm* — Holtz Holtz & Volek PC

(57) ABSTRACT

According to an embodiment, an amplifier which amplifies a first signal to output a second signal includes the following elements. The comparator compares the first signal with a third signal to output a fourth signal. The delay circuit delays a fifth signal by a delay time to generate a sixth signal. The first capacitor is connected between a voltage source and a first node that provides the third signal. The second capacitor is connected between the first node and a second node that provides the second signal. The first switch is connected between the second node and a constant current source, and is controlled by the fourth signal and the fifth signal. The second switch is connected between the first node and the second node, and is controlled by the fifth signal and the sixth signal.

14 Claims, 6 Drawing Sheets

(51) Int. Cl.
*H03M 1/56* (2006.01)
*H03F 3/08* (2006.01)

(58) Field of Classification Search
USPC .............. 348/300, 301, 308, 211.9, 295;
250/208.1, 214 A; 257/115, 123, 157;
327/136, 149, 152, 153, 158, 161;
330/280
See application file for complete search history.

(56) References Cited

U.S. PATENT DOCUMENTS

2010/0328119 A1* 12/2010 Kobayashi .......... H03M 1/0607
341/110
2017/0035376 A1* 2/2017 Surendranath ....... A61B 6/4241

* cited by examiner

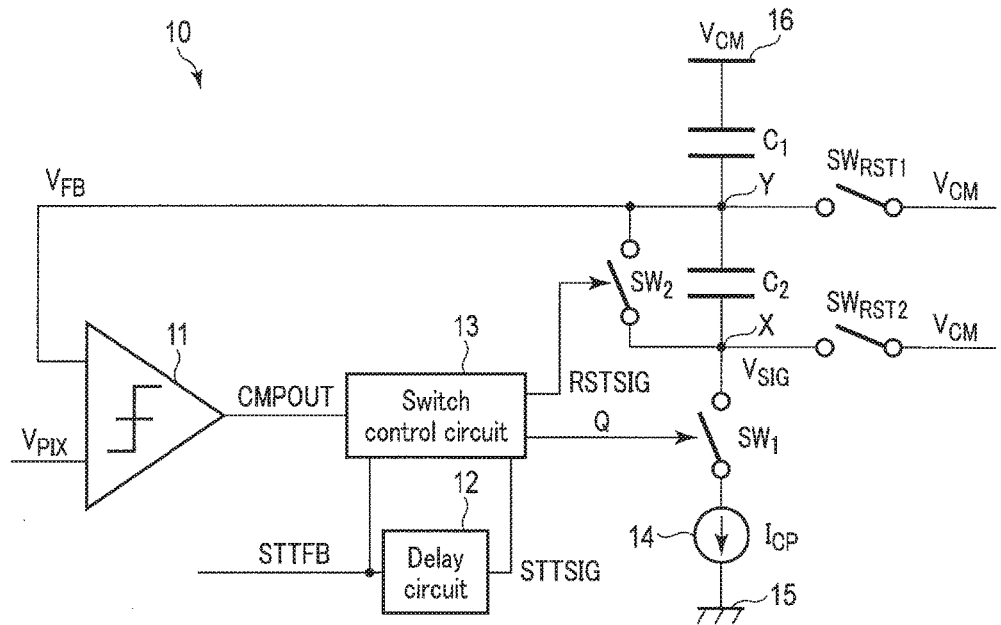
F I G. 1
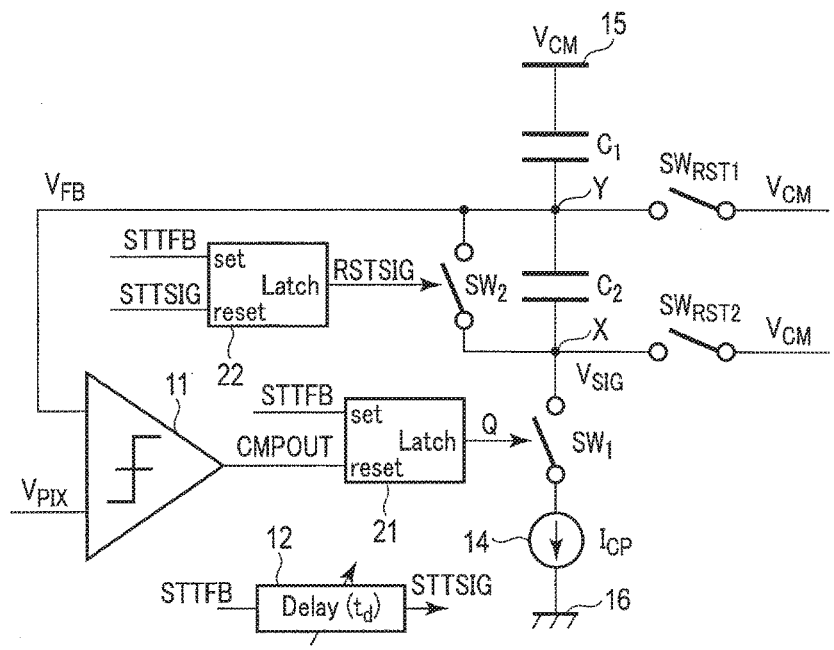
F I G. 2

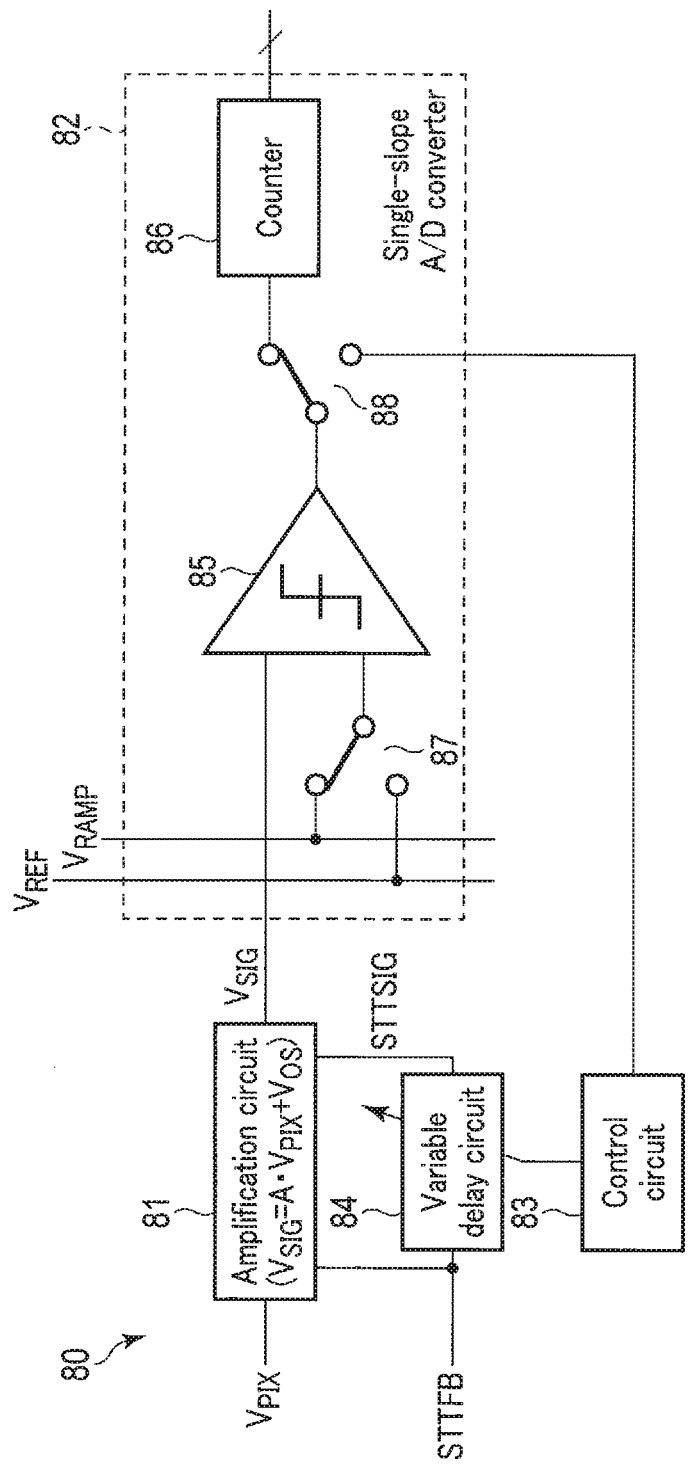
F I G. 8

AMPLIFIER, ELECTRIC CIRCUIT, AND IMAGE SENSOR

CROSS-REFERENCE TO RELATED APPLICATIONS

This application is based upon and claims the benefit of priority from Japanese Patent Application No. 2015-177480, filed Sep. 9, 2015, the entire contents of which are incorporated herein by reference.

FIELD

Embodiments described herein relate generally to an amplifier, and an electric circuit and an image sensor using the amplifier.

BACKGROUND

Switched capacitor amplifiers include an Op-Amp-based amplifier that uses an operational amplifier, and a comparator-based amplifier that uses a comparator. Comparator-based amplifiers are of low power consumption as they do not require an operational amplifier consuming a large power; however, they involve a drawback, namely, a large offset voltage due to a comparator delay. This is because, even after an input signal and a feedback signal match with each other, capacity is charged excessively as much as the delay time from the matching of the input signal and the feedback signal to the inverting of the comparator's output. It has been a demand for comparator-based amplifiers to reduce the offset voltage of a comparator.

BRIEF DESCRIPTION OF THE DRAWINGS

FIG. 1 is a schematic view showing an amplifier according to a first embodiment.

FIG. 2 is a schematic view showing a circuit example of the amplifier of FIG. 1.

FIG. 8 is a schematic view showing an electric circuit according to a fourth embodiment.

DETAILED DESCRIPTION

Figure 3:
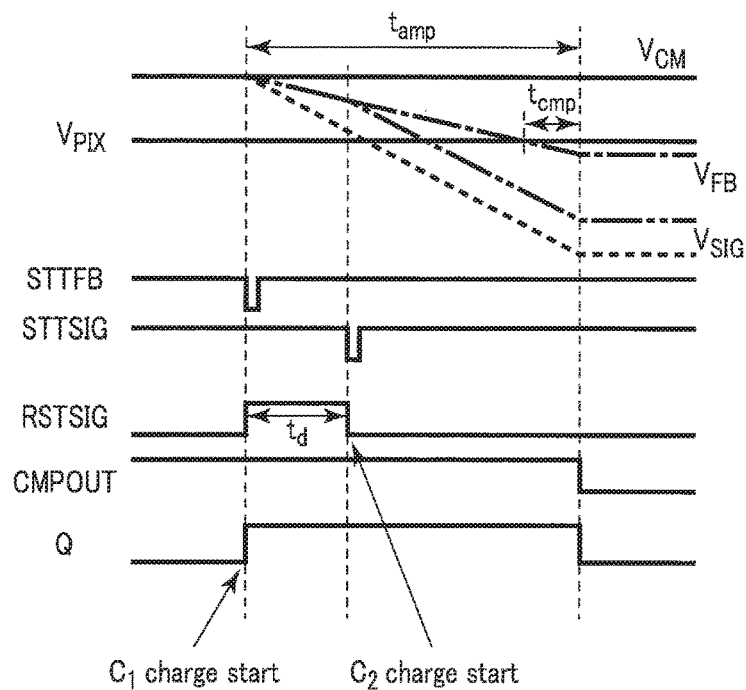
FIG. 3 is a timing chart showing an operation of the amplifier of FIG. 2.

According to an embodiment, an amplifier which amplifies a first signal to output a second signal includes a comparator, a delay circuit, a first capacitor, a second capacitor, a first switch, and a second switch. The comparator compares the first signal with a third signal to output a fourth signal. The delay circuit delays a fifth signal by a delay time to generate a sixth signal, the fifth signal indicating a timing of an amplifying operation start. The first capacitor is connected between a voltage source and a first node that provides the third signal.

The second capacitor is connected between the first node and a second node that provides the second signal. The first switch is connected between the second node and a constant current source, and is controlled by the fourth signal and the fifth signal. The second switch is connected between the first node and the second node, and is controlled by the fifth signal and the sixth signal.

Hereinafter, embodiments will be described with reference to the drawings. In the embodiments below, like elements will be denoted by like reference symbols, and duplicate descriptions will basically be omitted.

First Embodiment

FIG. 1 schematically shows a capacity division-type comparator-based amplifier 10 according to the first embodiment. The amplifier 10 shown in FIG. 1 amplifies an input signal $V_{PIX}$ by an arbitrary gain to generate an output signal $V_{SIG}$. The amplifier 10 includes a comparator 11, a delay circuit 12, a switch control circuit 13, a constant current source 14, a switch $SW_1$, a switch $SW_2$, a capacitor $C_1$, and a capacitor $C_2$. In the below mathematical expressions, etc., $C_n$ (wherein n=1 or 2) represents a capacitance of a capacitor $C_n$, and V (e.g., $V_{PIX}$) represents a voltage value of a signal V (e.g., input signal $V_{PIX}$).

The comparator 11 compares the input signal $V_{PIX}$ with a feedback signal $V_{FB}$ that simulates the output signal $V_{SIG}$, and generates a comparator output signal CMPOUT that accords with the comparison result. For example, the comparator 11 outputs a high level (high voltage level) signal when the voltage value of the input signal $V_{PIX}$ is smaller than the voltage value of the feedback signal $V_{FB}$, and outputs a low level (low voltage level) signal when the voltage value of the input signal $V_{PIX}$ is larger than the voltage value of the feedback signal $V_{FB}$. The output of the comparator 11 is connected to the switch control circuit 13.

The delay circuit 12 delays a control signal STTFB indicative of a timing of the amplifying operation start by a delay time $t_d$ to generate a delay control signal STTSIG. The switch control circuit 13 controls the switches $SW_1$ and $SW_2$ based on the comparator output signal CMPOUT, the control signal STTFB, and the delay control signal STTSIG.

The constant current source 14 supplies a constant current $I_{CP}$. One end of the constant current source 14 is connected to a voltage source (ground voltage in the example of FIG. 1) 15, and the other end of the constant current source 14 is connected to one end of the switch $SW_1$. The other end of the switch $SW_1$ is connected to a node X that provides the output signal $V_{SIG}$. The switch $SW_2$ and the capacitor $C_2$ are provided in parallel between the node X and a node Y that provides the feedback signal $V_{FB}$. Specifically, one end of the capacitor $C_2$ is connected to the node X, the other end of the capacitor $C_2$ is connected to the node Y, one end of the switch $SW_2$ is connected to the node X, and the other end of the switch $SW_2$ is connected to the node Y. One end of the capacitor $C_1$ is connected to the node Y, and the other end of the capacitor $C_1$ is connected to a voltage source (supply voltage $V_{CM}$ in the example of FIG. 1) 16. The capacitors $C_1$ and $C_2$ may have a fixed capacitance or may have a variable capacitance.

The node Y is connected to a supply voltage $V_{CM}$ via a switch $SW_{RST1}$. The node X is connected to a supply voltage $V_{CM}$ via a switch $SW_{RST2}$. Upon completion of the amplifying operation, the switches $SW_{RST1}$ and $SW_{RST2}$ are turned on and the capacitors $C_1$ and $C_2$ are discharged.

FIG. 2 shows an example of a circuit that realizes the amplifier 10. In the example of FIG. 2, the delay circuit 12 is a variable delay circuit. For example, the delay time $t_d$ of the delay circuit 12 may be adjusted according to an offset voltage of the comparator 11. The offset voltage may be detected by, for example, an offset voltage detection circuit according to the third or fourth embodiment described later. In another example, the delay time $t_d$ may be determined based on a delay time of the comparator 11. The delay time of the comparator 11 may be, for example, measured beforehand.

In the example of FIG. 2, the switch control circuit 13 includes two latch circuits 21 and 22. The control signal STTFB is input to a set terminal of the latch circuit 21, and the comparator output signal CMPOUT is input to a reset terminal of the latch circuit 21. An output signal Q of the latch circuit 21 is given to the switch $SW_1$. The control signal STTFB is input to a set terminal of the latch circuit 22, and the delay control signal STTSIG is input to a reset terminal of the latch circuit 22. An output signal RSTSIG of the latch circuit 22 is given to the switch $SW_2$.

FIG. 3 shows operational waveforms in the amplifier 10 that includes the circuit of FIG. 2. In FIG. 3, the dashed-dotted line indicates the feedback signal $V_{FB}$ according to this embodiment, and the dashed-two dotted line indicates the output signal $V_{SIG}$ according to this embodiment. Also, the broken line relates to a comparative example and indicates the output signal $V_{SIG}$ where the switch $SW_2$ is not used (where the OFF state is maintained).

As shown in FIG. 3, the voltage value of the output signal $V_{SIG}$ and the voltage value of the feedback signal $V_{FB}$ are both the voltage $V_{CM}$ ($V_{SIG}=V_{FB}=V_{CM}$) before the amplifying operation. The voltage value of the input signal $V_{PIX}$ is smaller than the voltage value of the feedback signal $V_{FB}$ ($V_{PIX}<V_{FB}$), and the comparator output signal CMPOUT is high level. The output signal Q of the latch circuit 21 and the output signal RSTSIG of the latch circuit 22 are low level.

The control signal STTFB switches from high level to low level at the timing of the amplifying operation start and returns to high level after a short time. The latch circuits 21 and 22 are set by the control signal STTFB and the output signal Q of the latch circuit 21 and the output signal RSTSIG of the latch circuit 22 are switched to high level. Thereby the switches $SW_1$ and $SW_2$ both become an ON state. Both ends of the capacitor $C_2$ are short-circuited by the turned-on switch $SW_2$.

The delay control signal STTSIG switches from high level to low level after the delay time $t_d$ has passed since the timing of the amplifying operation start. The latch circuit 22 is reset by the delay control signal STTSIG and the output signal RSTSIG of the latch circuit 22 is switched to low level. Thereby the switch $SW_2$ becomes an OFF state. In this manner, charge to the capacitor $C_2$ is started after the delay time $t_d$ from the start of charge to the capacitor $C_1$.

For the ON period of the switch $SW_2$, the both ends of the capacitor $C_2$ are short-circuited. As such, the capacitor $C_2$ is not charged during this period, giving $V_{SIG}=V_{FB}$.

The capacitor $C_1$ is charged from the amplification start, and $V_{FB}$ declines. The temporal change of $V_{FB}$ is expressed by the following expression (1).

$$\frac{dV_{FB}}{dt} = \frac{I_{CP}}{C_1} \tag{1}$$

Even after the switch $SW_2$ is turned off, the current flowing into the capacitor $C_1$ remains unchanged. Accordingly, the temporal change of $V_{FB}$ after the switch $SW_2$ is turned off is expressed by the expression (1).

Meanwhile, when the switch $SW_2$ is turned off, the capacitor $C_2$ is charged. The temporal change of $V_{SIG}$ is expressed by the following expression (2).

$$\frac{dV_{SIG}}{dt} = \frac{dV_{FB}}{dt} + \frac{I_{CP}}{C_2} = \frac{I_{CP}}{C_1} + \frac{I_{CP}}{C_2} \tag{2}$$

The comparator output signal CMPOUT switches to low level after a delay time $t_{cmp}$ of the comparator 11 has passed since the matching of the input signal $V_{PIX}$ and the feedback signal $V_{FB}$. The latch circuit 21 is reset by the comparator output signal CMPOUT and the output signal Q of the latch circuit 21 switches to low level. Thereby the switch $SW_1$ becomes an OFF state and charge to the capacitors $C_1$ and $C_2$ ends.

Supposing that the time from the start of amplification to the end of charge to the capacitors $C_1$ and $C_2$ is $t_{amp}$, the following expression (3) is given.

$$V_{CM} - \int_0^{t_{amp}-t_{cmp}} \frac{dV_{FB}}{dt} dt = V_{CM} - \frac{I_{CP}}{C_1}(t_{amp} - t_{cmp}) = V_{PIX} \tag{3}$$

Accordingly, $t_{amp}$ is expressed by the following expression (4).

$$t_{amp} = \frac{C_1}{I_{CP}}(V_{CM} - V_{PIX}) + t_{cmp} \tag{4}$$

On the other hand, according to the expression (2), $V_{SIG}$ is calculated as in the following expression (5).

$$V_{CM} - V_{SIG} = \int_0^{t_{amp}} \frac{dV_{SIG}}{dt} dt \tag{5}$$

$$= \int_0^{t_d} \frac{I_{CP}}{C_1} dt + \int_{t_d}^{t_{amp}} \left(\frac{I_{CP}}{C_1} + \frac{I_{CP}}{C_2}\right) dt$$

$$= \frac{I_{CP}}{C_1} t_d + \left(\frac{I_{CP}}{C_1} + \frac{I_{CP}}{C_2}\right)(t_{amp} - t_d)$$

Substituting the expression (4) for $t_{amp}$ into the expression (5) gives the following expression (6).

$$V_{CM} - V_{SIG} = \frac{I_{CP}}{C_1} t_d + \left(\frac{I_{CP}}{C_1} + \frac{I_{CP}}{C_2}\right)\left\{\frac{C_1}{I_{CP}}(V_{CM} - V_{PIX}) + t_{cmp} - t_d\right\} \tag{6}$$

$$= \left(1 + \frac{C_1}{C_2}\right)(V_{CM} - V_{PIX}) + \left\{\left(\frac{I_{CP}}{C_1} + \frac{I_{CP}}{C_2}\right) t_{cmp} - \frac{I_{CP}}{C_2} t_d\right\}$$

The first term in the expression (6) is the amplified voltage that is proportional to the input signal $V_{PIX}$, and the second term is the offset voltage. When $t_d = t_{cmp}(1+C_2/C_1)$, the second term is zero, and an output without an offset voltage is obtained. In this embodiment, the gain of the amplifier 10 is $1+C_1/C_2$. For example, if an 8-fold gain is assumed, then $C_1/C_2=7$; thus, setting $t_d=t_{cmp}\times 8/7$ may enable elimination of an offset voltage. If the delay time $t_{cmp}$ of the comparator 11 is constant and does not depend on the input signal $V_{PIX}$, use of the constant delay time $t_{cmp}$ in each amplification may enable elimination of an offset voltage.

Note that the delay time $t_d$ is not limited to the design to yield a zero offset voltage. For example, the delay time $t_d$ may be designed so that the offset voltage will be a tolerable value or less. As one example, the delay time $t_d$ may be set to a value satisfying $0.9\ t_{cmp}/(1+C_2/C_1) \leq t_d \leq 1.1\ t_{cmp}/(1+C_2/C_1)$. Also, the delay time $t_d$ may be designed such that the output signal $V_{SIG}$ will fall within the input range of a device (e.g., analog/digital converter) provided at the subsequent stage of the amplifier 10.

Descriptions have been made to the examples where the two latch circuits 21 and 22 are used to control the switches $SW_1$ and $SW_2$. For the control of the switches $SW_1$ and $SW_2$, implementation with digital circuits other than latch circuits may also be possible.

As in the foregoing descriptions, the amplifier 10 according to the first embodiment includes the comparator 11 which compares the input signal $V_{PIX}$ with the feedback signal $V_{FB}$ to generate the comparator output signal CMPOUT, the delay circuit 12 which delays the control signal STTFB by a delay time $t_d$ to generate the delay control signal STTSIG, the capacitor $C_1$ connected between the voltage source 15 and the node Y, the capacitor $C_2$ connected between the node Y and the node X, the switch $SW_1$ connected between the node X and the constant current source 14 and controlled by the comparator output signal CMPOUT and the control signal STTFB, and the switch $SW_2$ connected between the node X and the node Y and controlled by the control signal STTFB and the delay control signal STTSIG. The switches $SW_1$ and $SW_2$ are turned on by the control signal STTFB and charge to the capacitor $C_2$ starts. After the delay time $t_d$ from the start of charge to the capacitor $C_2$, the switch $SW_2$ is turned off by the delay control signal STTSIG and charge to the capacitor $C_1$ starts. By providing a period of uncharging the capacitor $C_1$ in this manner, the offset voltage due to the delay of the comparator 11 may be reduced.

Second Embodiment

Figure 4:
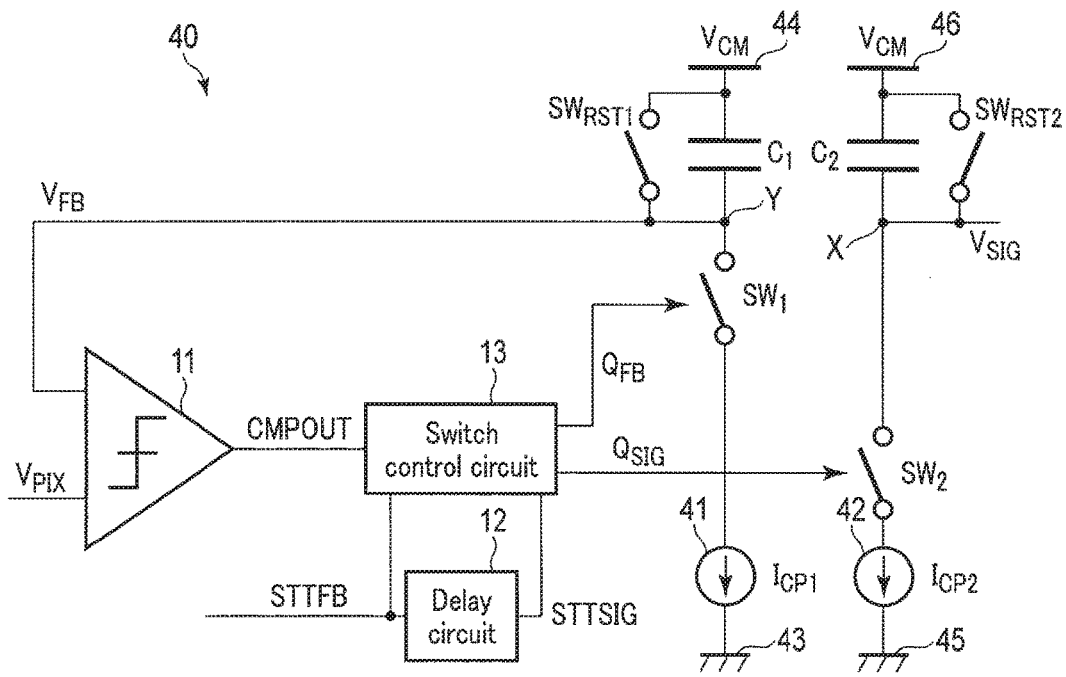
FIG. 4 is a schematic view showing an amplifier according to a second embodiment.

FIG. 4 schematically shows a replica-type comparator-based amplifier 40 according to the second embodiment. As shown in FIG. 4, the amplifier 40 includes a comparator 11, a delay circuit 12, a switch control circuit 13, a constant current source 41, a constant current source 42, a switch $SW_1$, a switch $SW_2$, a capacitor $C_1$, and a capacitor $C_2$.

The comparator 11 compares an input signal $V_{PIX}$ with a feedback signal $V_{FB}$ that simulates an output signal $V_{SIG}$, and generates a comparator output signal CMPOUT that accords with the comparison result. The delay circuit 12 delays a control signal STTFB indicative of a timing of the amplifying operation start by a delay time $t_d$ to generate a delay control signal STTSIG. The switch control circuit 13 controls the switches $SW_1$ and $SW_2$ based on the comparator output signal CMPOUT, the control signal STTFB, and the delay control signal STTSIG.

The constant current source 41 supplies a constant current $I_{CP1}$. One end of the constant current source 41 is connected to a voltage source (ground voltage in the example of FIG. 4) 43, and the other end of the constant current source 41 is connected to one end of the switch $SW_1$. The other end of the switch $SW_1$ is connected to a node Y that provides the feedback signal $V_{FB}$. One end of the capacitor $C_1$ is connected to the node Y, and the other end of the capacitor $C_1$ is connected to a voltage source (supply voltage $V_{CM}$ in the example of FIG. 4) 44. Between the node Y and the voltage source 44, a switch $SW_{RST1}$ is provided in parallel with the capacitor $C_1$.

The constant current source 42 supplies a constant current $I_{CP2}$. One end of the constant current source 42 is connected to a voltage source (ground voltage in the example of FIG. 4) 45, and the other end of the constant current source 42 is connected to one end of the switch $SW_2$. The other end of the switch $SW_2$ is connected to a node X that provides the output signal $V_{SIG}$. One end of the capacitor $C_2$ is connected to the node X, and the other end of the capacitor $C_2$ is connected to a voltage source (supply voltage $V_{CM}$ in the example of FIG. 4) 46. Between the node X and the voltage source 46, a switch $SW_{RST2}$ is provided in parallel with the capacitor $C_2$.

In this embodiment, the capacitor $C_1$ and the constant current source 41 which generate the feedback signal $V_{FB}$ are separate from the capacitor $C_2$ and the constant current source 42 which generate the output signal $V_{SIG}$. Charge to the capacitors $C_1$ and $C_2$ may be controlled independently; thus, a switch to short-circuit both ends of the capacitor $C_2$ as in the first embodiment is not required.

Figure 5:
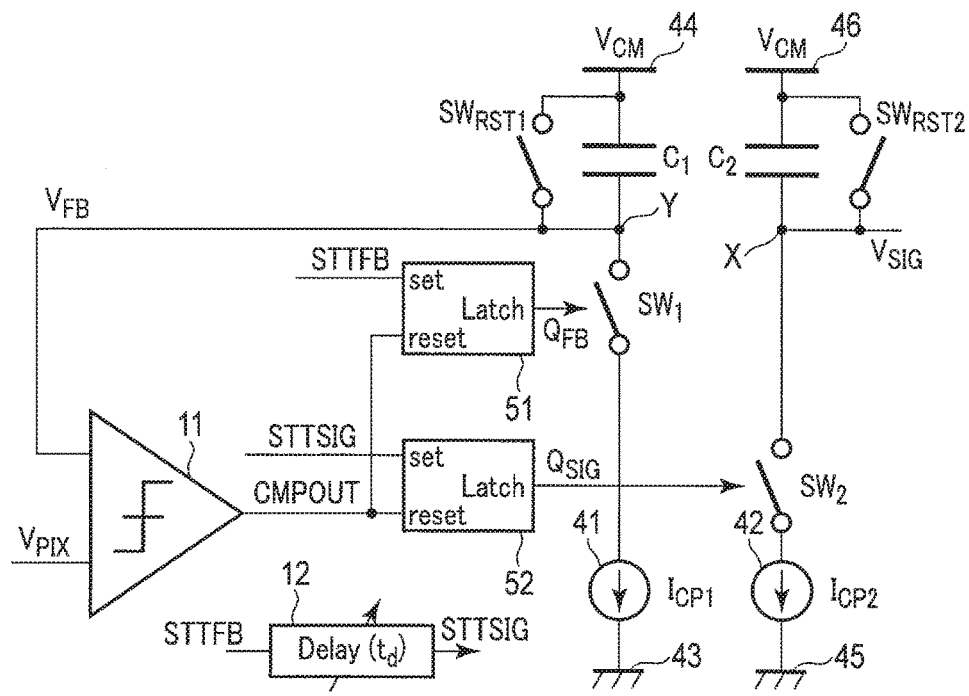
FIG. 5 is a schematic view showing a circuit example of the amplifier of FIG. 4.

FIG. 5 shows an example of a circuit that realizes the amplifier 40. In the example of FIG. 5, the delay circuit 12 is a variable delay circuit. The switch control circuit 13 includes two latch circuits 51 and 52. The control signal STTFB is input to a set terminal of the latch circuit 51, and the comparator output signal CMPOUT is input to a reset terminal of the latch circuit 51. An output signal $Q_{FB}$ of the latch circuit 51 is given to the switch $SW_1$. The delay control signal STTSIG is input to a set terminal of the latch circuit 52, and the comparator output signal CMPOUT is input to a reset terminal of the latch circuit 52. An output signal $Q_{SIG}$ of the latch circuit 52 is given to the switch $SW_2$.

Figure 6:
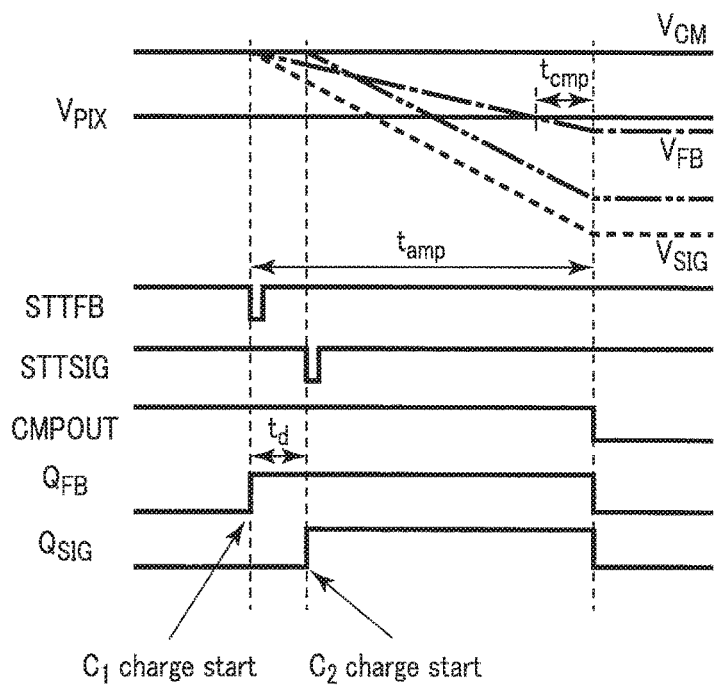
FIG. 6 is a timing chart showing an operation of the amplifier of FIG. 5.

FIG. 6 shows operational waveforms in the amplifier 40 that includes the circuit of FIG. 5. In FIG. 6, the dashed-dotted line indicates the feedback signal $V_{FB}$ according to this embodiment, and the dashed-two dotted line indicates the output signal $V_{SIG}$ according to this embodiment. Also, the broken line relates to a comparative example and indicates the output signal $V_{SIG}$ generated when the delay circuit 12 is not used (when charge to the capacitors $C_1$ and $C_2$ starts concurrently).

As shown in FIG. 6, the voltage value of the output signal $V_{SIG}$ and the voltage value of the feedback signal $V_{FB}$ are both the voltage $V_{CM}$ ($V_{SIG}=V_{FB}=V_{CM}$) before the amplifying operation. The voltage value of the input signal $V_{PIX}$ is smaller than the voltage value of the feedback signal $V_{FB}$ ($V_{PIX}<V_{FB}$), and the comparator output signal CMPOUT is high level. The output signal $Q_{FB}$ of the latch circuit 51 and the output signal $Q_{SIG}$ of the latch circuit 52 are low level.

The control signal STTFB switches from high level to low level at the timing of the amplifying operation start. The latch circuit 51 is set by the control signal STTFB and the output signal $Q_{FB}$ of the latch circuit 51 is switched to high level. Thereby the switch $SW_1$ becomes an ON state. The capacitor $C_1$ is charged from the amplification start. Similar to the descriptions of the first embodiment, the expression (4) as above is obtained for the feedback signal $V_{FB}$.

The delay control signal STTSIG switches from high level to low level after the delay time $t_d$ has passed since the timing of the amplifying operation start. The latch circuit 52 is set by the delay control signal STTSIG and the output signal $Q_{SIG}$ of the latch circuit 52 is switched to high level. Thereby the switch $SW_2$ becomes an ON state. Charge to the capacitor $C_2$ is started after the delay time $t_d$ from the start of charge to the capacitor $C_1$. The temporal change of $V_{SIG}$ is expressed by the following expression (7).

$$\frac{dV_{SIG}}{dt} = \frac{I_{CP2}}{C_2} \quad (7)$$

According to the expression (7), $V_{SIG}$ is calculated as in the following expression (8).

$$V_{CM} - V_{SIG} = \int_{t_d}^{t_{amp}} \frac{I_{CP2}}{C_2} dt = \frac{I_{CP2}}{C_2}(t_{amp} - t_d) \quad (8)$$

Substituting the expression (4) for $t_{amp}$ into the expression (8) gives the following expression (9).

$$V_{CM} - V_{SIG} = \frac{I_{CP2}}{C_2} \left\{ \frac{C_1}{I_{CP1}}(V_{CM} - V_{PIX}) + t_{cmp} - t_d \right\} \quad (9)$$
$$= \frac{C_1 I_{CP2}}{C_2 I_{CP1}}(V_{CM} - V_{PIX}) + \frac{I_{CP2}}{C_2}(t_{cmp} - t_d)$$

The first term in the expression (9) is the amplified voltage that is proportional to the input signal $V_{PIX}$, and the second term is the offset voltage. In this embodiment, setting $t_d = t_{cmp}$ may enable elimination of an offset voltage regardless of the gain ($C_1 I_{CP2}/C_2 I_{CP1}$) of the amplifier.

Note that the delay time $t_d$ is not limited to the design to yield a zero offset voltage. For example, the delay time $t_d$ may be designed so that the offset voltage will be a tolerable value or less. For example, the delay time $t_d$ may be set to a value satisfying $0.9\ t_{cmp} \le t_d \le 1.1\ tc_{mp}$. Also, the delay time $t_d$ may be set such that the output signal $V_{SIG}$ will fall within the input range of a device (e.g., analog/digital converter) provided at the subsequent stage of the amplifier 40.

Descriptions have been made to the examples where the two latch circuits 51 and 52 are used to control the switches $SW_1$ and $SW_2$. For the control of the switches $SW_1$ and $SW_2$, implementation with digital circuits other than latch circuits may also be possible.

As in the foregoing descriptions, the amplifier 40 according to the second embodiment includes the comparator 11 which compares the input signal $V_{PIX}$ with the feedback signal $V_{FB}$ and generates the comparator output signal CMPOUT, the delay circuit 12 which delays the control signal STTFB by a delay time $t_d$ to generate the delay control signal STTSIG, the capacitor $C_1$ connected between the voltage source 44 and the node Y, the switch $SW_1$ connected between the node Y and the constant current source 41 and controlled by the comparator output signal CMPOUT and the control signal STTFB, the capacitor $C_2$ connected between the voltage source 46 and the node X, and the switch $SW_2$ connected between the node X and the constant current source 42 and controlled by the comparator output signal CMPOUT and the delay control signal STTSIG. The switch $SW_1$ is turned on by the control signal STTFB and charge to the capacitor $C_1$ starts. After the delay time $t_d$ from the start of charge to the capacitor $C_1$, the switch $SW_2$ is turned on by the delay control signal STTSIG and charge to the capacitor $C_2$ starts. By providing a period of uncharging the capacitor $C_2$ in this manner, the offset voltage due to the delay of the comparator 11 may be reduced.

Third Embodiment

Figure 7:
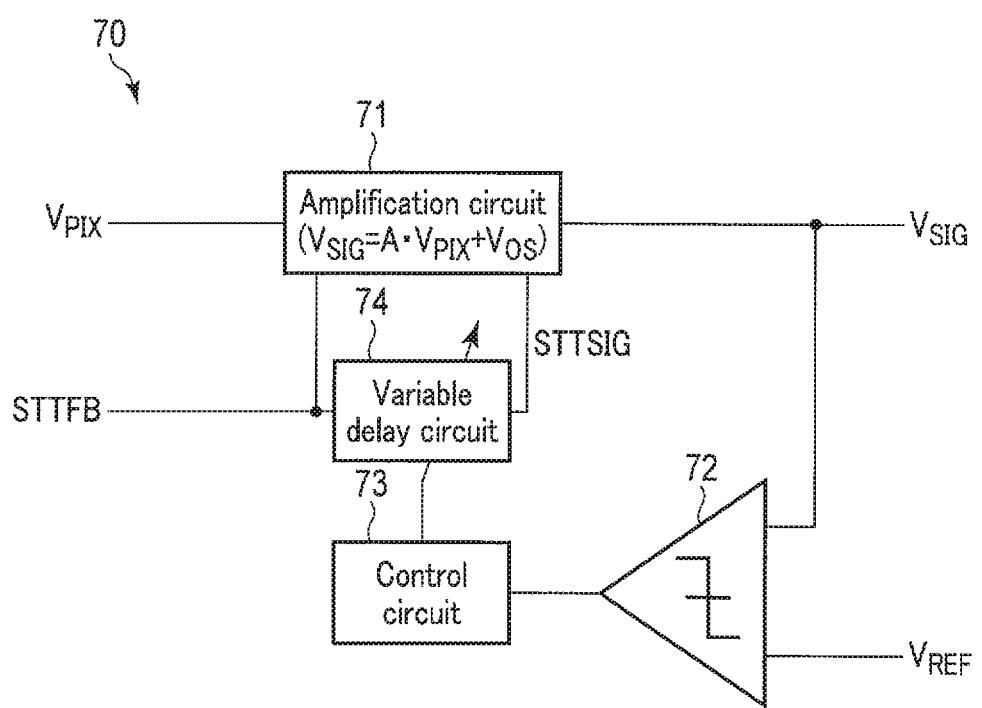
FIG. 7 is a schematic view showing an amplifier according to a third embodiment.

FIG. 7 schematically shows an amplifier 70 according to the third embodiment. As shown in FIG. 7, the amplifier 70 includes an amplification circuit 71, a comparator 72, and a control circuit 73. The amplification circuit 71 is, for example, the amplifier 10 (FIG. 1) according to the first embodiment or the amplifier 40 (FIG. 4) according to the second embodiment. When the amplifier 10 is adopted as the amplification circuit 71, a variable delay circuit 74 shown in FIG. 7 corresponds to the delay circuit 12 (FIG. 1) in the amplifier 10. The comparator 72 compares an output signal $V_{SIG}$ of the amplification circuit 71 with a reference signal $V_{REF}$. The control circuit 73 controls a delay time $t_d$ of the variable delay circuit 74 based on an output signal of the comparator 72. The comparator 72 and the control circuit 73 are collectively called an offset voltage detection circuit.

Descriptions will be made to the operations to control the delay time $t_d$. First, an input signal $V_{PIX}$ is set to 0. Thereby the output signal $V_{SIG}$ has only an offset voltage. Next, the control circuit 73 continuously changes the delay time $t_d$. The control circuit 73 determines the delay time $t_d$ to be a value at the change of the output signal of the comparator 72 (e.g., at the switch from high level to low level). For example, the control circuit 73 determines the delay time $t_d$ such that the offset voltage will be 0.

The amplifier 70 according to the third embodiment includes the offset voltage detection circuit that performs feedback control to control the delay time $t_d$ of the variable delay circuit 74 using the output signal $V_{SIG}$. This allows easy circuit implementation as compared to the case of accurately measuring a delay time $t_{cmp}$ of the comparator used for amplification (e.g., the comparator 11 shown in FIG. 1). Additionally, when a switch in the amplification circuit 71 (e.g., switches $SW_1$ and $SW_2$) is realized by MOSFET (metal-oxide semiconductor field-effect transistor), the offset voltage caused due to charge injection may also be eliminated.

Fourth Embodiment

FIG. 8 schematically shows an electric circuit 80 according to the fourth embodiment. As shown in FIG. 8, the electric circuit 80 includes an amplification circuit 81, an analog-to-digital (A/D) converter 82, and a control circuit 83. The amplification circuit 81 is, for example, the amplifier 10 (FIG. 1) according to the first embodiment or the amplifier 40 (FIG. 4) according to the second embodiment. When the amplifier 10 is adopted as the amplification circuit 81, a variable delay circuit 84 shown in FIG. 8 corresponds to the delay circuit 12 (FIG. 1) in the amplifier 10.

The A/D converter 82 performs A/D conversion on an output signal $V_{SIG}$ of the amplification circuit 81. In the example shown in FIG. 8, the A/D converter 82 is a single-slope A/D converter typically used for a CMOS (complementary metal-oxide semiconductor) image sensor. The A/D converter 82 includes a comparator 85, a counter 86, and switches 87 and 88. The comparator 85 compares the output signal $V_{SIG}$ of the amplification circuit 81 with a ramp voltage $V_{RAMP}$ and outputs a comparator output signal that accords with the comparison result. The counter 86 receives pulses of a clock from a clock pulse generator (not shown) and counts the number of pulses received until a change in the comparator output signal. The counter 86 outputs a digital signal that accords with the number of pulses.

To adjust a delay time $t_d$, the switches 87 and 88 are switched. Thereby, a reference voltage $V_{REF}$, in lieu of the ramp voltage $V_{RAMP}$, is input to an input end of the comparator 85 and the output of the comparator 85 is connected to the control circuit 83. Operations of adjusting the delay time $t_d$ are similar to those described in the third embodiment, so their descriptions are omitted here.

Note that the A/D converter 82 is not limited to single-slope A/D converters, but may be other types of A/D converters using a comparator, such as a successive approximation-type A/D converter.

The electric circuit 80 according to the fourth embodiment utilizes the comparator 85 included in the A/D converter 82 connected at the subsequent stage of the amplification circuit 81, so that the delay time $t_d$ of the variable delay circuit 84 may be adjusted. This may eliminate the necessity of providing a comparator that is exclusive for offset voltage detection, and may reduce the circuit area.

Fifth Embodiment

Figure 9:
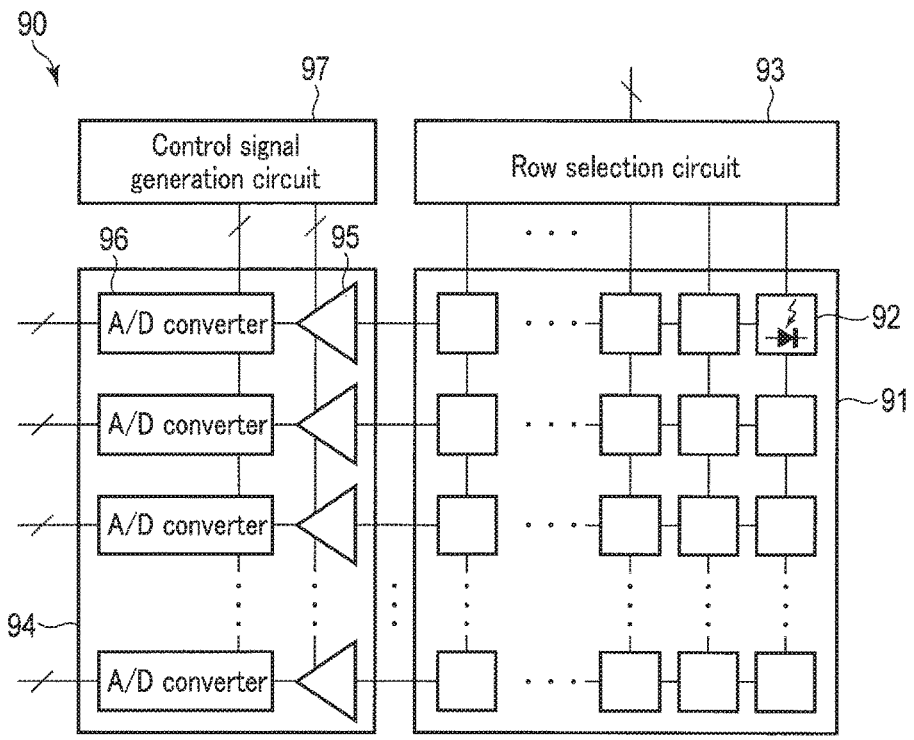
FIG. 9 is a schematic view showing an image sensor according to a fifth embodiment.

FIG. 9 schematically shows an image sensor 90 according to the fifth embodiment. As shown in FIG. 9, the image sensor 90 includes a pixel array 91, a row selection circuit 93, a read circuit 94, and a control signal generation circuit 97. The pixel array 91 includes a plurality of pixels 92 corresponding to photoelectric conversion elements to perform photoelectric conversion on incident light. The pixels 92 are arranged in N rows and M columns. The row selection circuit 93 sequentially selects pixels 92 of each row. The read circuit 94 converts electric signals generated by the M pixels 92 selected by the row selection circuit 93 into digital signals. The read circuit 94 includes M sets of an amplifier 95 and an A/D converter 96. Each amplifier 95 amplifies an electric signal received from the pixel 92 of the corresponding row. The corresponding A/D converter 96 performs A/D conversion on the amplified electric signal. The control signal generation circuit 97 generates a control signal to control the read circuit 94.

Figure 10:
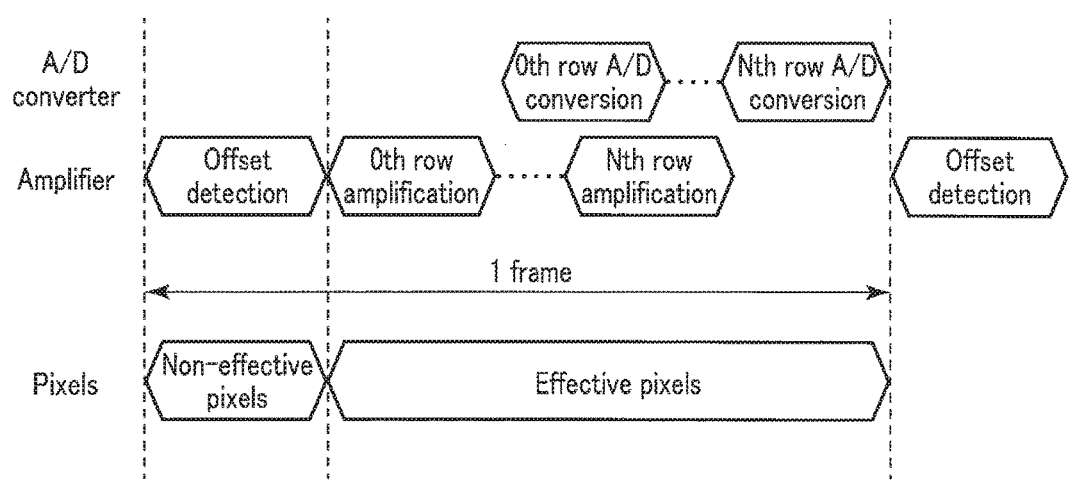
FIG. 10 is a sequence diagram showing an operation example of the image sensor of FIG. 9.

As each set of the amplifier 95 and the A/D converter 96, for example, the electric circuit 80 according to the fourth embodiment may be adopted, while this is not a limitation. For example, the amplifier 95 may be any amplifier such as the amplifier 70 according to the third embodiment. When the electric circuit 80 according to the fourth embodiment is adopted as each set of the amplifier 95 and the A/D converter 96, the A/D converter 96 is unable to perform A/D conversion during the period for detecting an offset voltage of the amplifier 95. The image sensor 90, when it is a CMOS image sensor, includes effective pixels for use in imaging and non-effective pixels which are shielded from light. A/D conversion is not required during the period for reading the non-effective pixels; thus, the offset voltage of the amplifier 95 may be detected during this period as shown in FIG. 10. Utilizing the period for reading non-effective pixels may enable detection of the offset voltage of the amplifier 95 once in one frame. One frame here indicates the processing for sequentially reading all the pixels in the pixel array 91. In the frame, non-effective pixels are read and then effective pixels are read. Thus, even when a supply voltage or temperature has changed during the operation of the CMOS image sensor and it has resulted in a change of the offset voltage of the amplifier 95, the offset voltage may be eliminated.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An amplifier which amplifies a first signal to output a second signal, the amplifier comprising:
   a comparator which compares the first signal with a third signal to output a fourth signal;
   a delay circuit which delays a fifth signal by a delay time to generate a sixth signal, the fifth signal indicating a timing of an amplifying operation start;
   a first capacitor connected between a voltage source and a first node that provides the third signal;
   a second capacitor connected between the first node and a second node that provides the second signal;
   a first switch connected between the second node and a constant current source, the first switch being controlled by the fourth signal and the fifth signal; and
   a second switch connected between the first node and the second node, the second switch being controlled by the fifth signal and the sixth signal.

2. The amplifier according to claim 1, further comprising an offset voltage detection circuit which detects an offset voltage due to a delay of the comparator, wherein the delay time is adjusted according to the detected offset voltage.

3. An image sensor comprising:
   a photoelectric conversion element which performs photoelectric conversion on incident light to generate the first signal;
   the amplifier according to claim 1; and
   an analog/digital converter which performs analog-to-digital conversion on the second signal.

4. An image sensor comprising:
   photoelectric conversion elements, each of which performs photoelectric conversion on incident light to generate the first signal;
   amplifiers coupled to the photoelectric conversion elements, each of the amplifiers comprising the amplifier according to claim 2; and
   analog/digital converters, each of which performs analog-to-digital conversion on the second signal,
   wherein the offset voltage detection circuit detects the offset voltage during a period for reading a portion of the photoelectric conversion elements which is not used for imaging.

5. An electric circuit comprising:
   the amplifier according to claim 1;
   an analog/digital converter which includes an comparator and performs analog-to-digital conversion on the second signal; and
   an offset voltage detection circuit which detects an offset voltage due to a delay of the comparator, by using the comparator included in the analog/digital converter,
   wherein the delay time is adjusted according to the detected offset voltage.

6. An image sensor comprising:
   photoelectric conversion elements, each of which performs photoelectric conversion on incident light to generate the first signal; and
   electric circuits coupled to the photoelectric conversion elements, each of the electric circuits comprising the electric circuit according to claim 5.

7. The image sensor according to claim 6, wherein the offset voltage detection circuit detects the offset voltage during a period for reading a portion of the photoelectric conversion elements which is not used for imaging.

8. An amplifier which amplifies a first signal to output a second signal, the amplifier comprising:
- a comparator which compares the first signal with a third signal to output a fourth signal;
- a delay circuit which delays a fifth signal by a delay time to generate a sixth signal, the fifth signal indicating a timing of an amplifying operation start;
- a first capacitor connected between a first voltage source and a first node that provides the third signal;
- a first switch connected between the first node and a first constant current source, the first switch being controlled by the fourth signal and the fifth signal;
- a second capacitor connected between a second voltage source and a second node that provides the second signal; and
- a second switch connected between the second node and a second constant current source, the second switch being controlled by the fourth signal and the sixth signal.

9. The amplifier according to claim 8, further comprising an offset voltage detection circuit which detects an offset voltage due to a delay of the comparator, wherein the delay time is adjusted according to the detected offset voltage.

10. An image sensor comprising:
- a photoelectric conversion element which performs photoelectric conversion on incident light to generate the first signal;
- the amplifier according to claim 8; and
- an analog/digital converter which performs analog-to-digital conversion on the second signal.

11. An image sensor comprising:
- photoelectric conversion elements, each of which performs photoelectric conversion on incident light to generate the first signal;
- amplifiers coupled to the photoelectric conversion elements, each of the amplifiers comprising the amplifier according to claim 9; and
- analog/digital converters, each of which performs analog-to-digital conversion on the second signal,
- wherein the offset voltage detection circuit detects the offset voltage during a period for reading a portion of the photoelectric conversion elements which is not used for imaging.

12. An electric circuit comprising:
- the amplifier according to claim 8;
- an analog/digital converter which includes an comparator and performs analog-to-digital conversion on the second signal; and
- an offset voltage detection circuit which detects an offset voltage due to a delay of the comparator, by using the comparator included in the analog/digital converter,
- wherein the delay time is adjusted according to the detected offset voltage.

13. An image sensor comprising:
- photoelectric conversion elements, each of which performs photoelectric conversion on incident light to generate the first signal; and
- electric circuits coupled to the photoelectric conversion elements, each of the electric circuits comprising the electric circuit according to claim 12.

14. The image sensor according to claim 13, wherein the offset voltage detection circuit detects the offset voltage during a period for reading a portion of the photoelectric conversion elements which is not used for imaging.

* * * * *